Sept. 23, 1952 R. S. BAILEY ET AL 2,611,859
REPEATER FOR FREQUENCY MODULATED WAVES
Filed Jan. 7, 1950
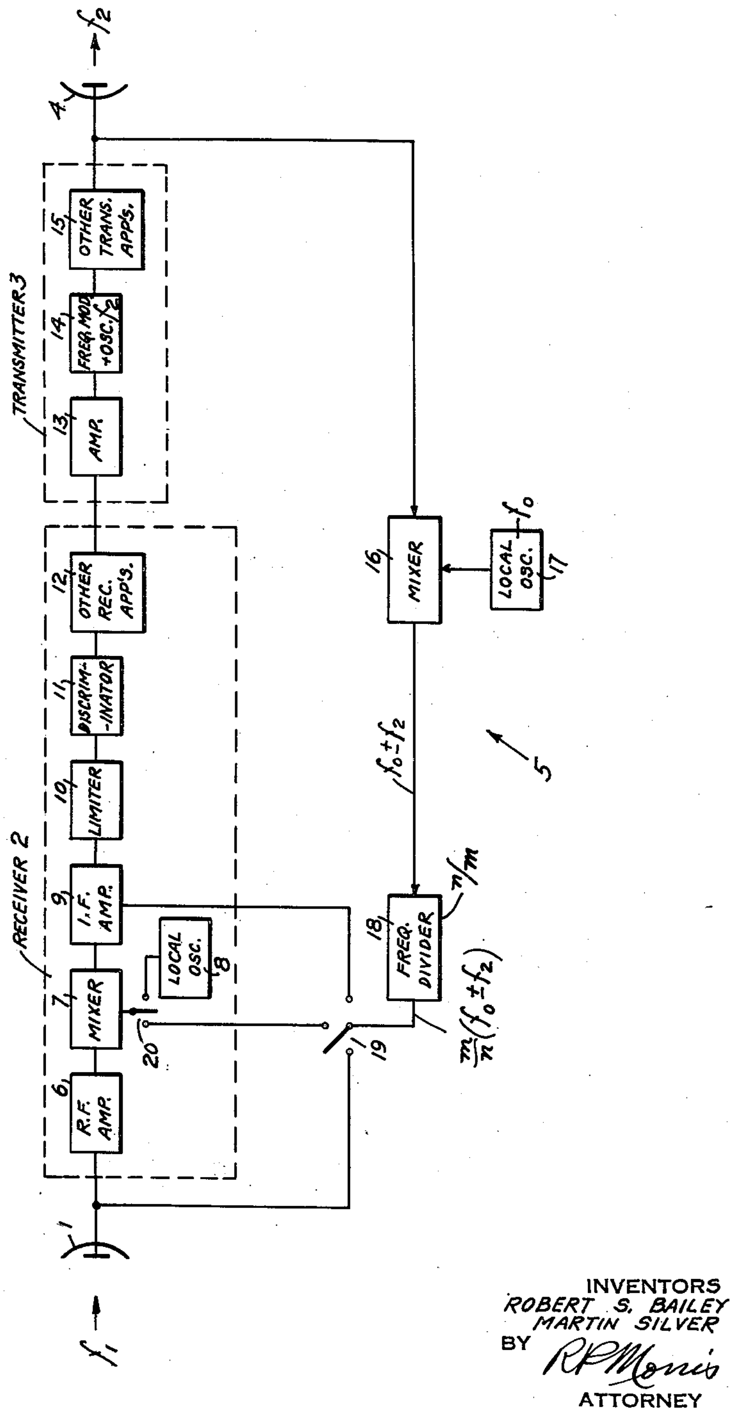
INVENTORS
ROBERT S. BAILEY
MARTIN SILVER
BY R P Morris
ATTORNEY Patented Sept. 23, 1952 2,611,859

UNITED STATES PATENT OFFICE 2,611,859

REPEATER FOR FREQUENCY MODULATED WAVES

Robert S. Bailey, Phoenix, Ariz., and Martin Silver, Fairlawn, N. J., assignors to International Standard Electric Corporation, New York, N. Y., a corporation of Delaware Application January 7, 1950, Serial No. 137,344

6 Claims. (Cl. 250—15)

This invention relates to repeaters for frequency modulated waves and particularly to negative feedback in such repeaters.

It has been heretofore been proposed to reduce noise and distortion introduced in receivers for frequency modulated waves, by the use of negative feedback. An arrangement of this type may be found in U. S. Patent No. 2,075,503 granted March 30, 1937 to J. G. Chaffee entitled "Reception of Frequency Modulated Waves," and a discussion of the theory of negative feedback in frequency modulated wave receivers appears in the Bell System Technical Journal for July 1939 (page 395) in an article by John R. Carson (referring also to other articles on the same subject). The present invention is principally concerned with reducing noise and distortion in repeaters for frequency modulated waves. In such repeaters it has been found desirable to provide a receiver for demodulating the frequency modulated waves (often including one or more drop channels for local station connections where the signals are multi-channel signals), and a transmitter in which the resulting amplitude modulated signals are used to frequency modulate a new outgoing carrier. While it is possible to reduce the noise and distortion introduced in the receiver of a repeater by using a negative feedback arrangement around the receiver, as taught by the above-mentioned patent, and further while it is possible to reduce the noise and distortion introduced by the transmitter of said repeater by providing a negative feedback arrangement around the transmitter, the actual noise and distortion introduced is a function of the combined receiver and transmitter.

Accordingly it is an object of the present invention to provide, in a repeater for frequency modulated waves, negative feedback around the entire repeater, that is from an output point of the transmitter to an input point of the receiver.

In the negative feedback arrangement described in the above-mentioned patent the amplitude modulated signal is taken at an output point of the receiver and sent back through an amplifier to frequency modulate the local oscillator of the receiver. By carying the gain of said amplifier the depth of modulation of the local oscillator is controlled thereby controlling the amount of negative feedback. In the repeater system of the present invention frequency modulated waves are obtained at an output point of the transmitter, and the problem is to feed such frequency modulated waves back to provide negative feedback while at the same time controlling or determining the depth of modulation of the frequency modulated waves thus fed back and thus the amount of feedback.

In accordance with a feature of the present invention a frequency modulated wave at the output of a translating device (such as for example, a repeater) is negatively fed back to an input point of said translating device without changing the frequency modulation to amplitude modulation. In accordance with another feature of the present invention this frequency modulated wave feedback is accomplished while controlling both the center frequency and the depth of modulation of the negative feedback signal.

According to the invention, the frequency modulated energy as received at a repeater station, demodulated (and when desired, locally routed over drop channels) and again modulated onto a new carrier wave frequency and retransmitted in a conventional manner, has a portion of the frequency modulated output energy of the transmitter abstracted and mixed with the oscillations of a local oscillator of suitable high frequency. A resultant wave from this mixing is frequency converted, preferably through frequency division, to a frequency suitable for mixing with the incoming frequency modulated wave according to the point at which it is injected at the receivers. The center frequency and depth of valuation of the wave fed back are determined by suitably selecting the frequency of the local oscillator and the divisor of the frequency divider.

The above-mentioned and other features and objects of this invention and the manner of attaining them will become more apparent and the invention itself will be best understood, by reference to the following description of an embodiment of the invention taken in conjunction with the accompanying drawing wherein the figure is a schematic and block diagram of a repeater system employing negative feedback in accordance with the present invention.

Referring now to the figure in describing the repeater there illustrated, an incoming wave frequency modulated around a center frequency $f_1$ is received on a directive antenna 1 which is coupled to a conventional receiver 2 wherein the frequency modulation is translated into amplitude modulation, the resulting amplitude modulated signal being applied to a transmitter 3, which likewise may be of conventional design, to frequency modulate a second carrier of center frequency $f_2$, the output of the transmitter 3 in turn being coupled to directive antenna 4 for radiating the signal thus produced. A negative feedback arrangement 5, in accordance with the present invention, is coupled between an output point of transmitter 3 and an input point of receiver 2.

In order to make the present invention clear, certain components of the receiver and transmitter have been indicated in the figure, it being understood of course that other components usually found in such receivers have been omitted since they are not essential to an understanding of the present invention. Thus the figure indicates that the incoming frequency modulated wave of center frequency $f_1$ is applied in the receiver to a radio frequency amplifier 6, then to a mixer 7, where it is mixed with the output of a local oscillator 8, the output of the mixer being applied to suitable intermediate frequency amplifiers 9, limiter 10, and discriminator 11 where the frequency modulated signal is translated into an amplitude modulated signal. The amplitude modulated signal is then fed through other apparatus designated by the numeral 12, which may include additional amplifiers, and where the signal is a multi-channel signal, this apparatus may also include means for separating the various channels (as by sub-carrier filtering), before the amplitude modulated signal which is to be retransmitted is applied to the transmitter 3. The transmitter 3 may include additional amplifiers and mixers 13 which may for example, be used to mix the signal to be repeated with a locally generated signal which is also to be inserted for transmission in the multi-channel waves. This amplitude modulated energy is then applied to a frequency modulator and oscillator 14 to frequency modulate a carrier whose center frequency is $f_2$. After passing through other additional apparatus designated by the numeral 15 which may include amplifying means or other conventional devices, the frequency modulated wave of center frequency $f_2$ is then applied to the antenna 4.

The frequency modulated energy of center frequency $f_2$ that is to be fed back may be taken from any suitable output point of the transmitter 3, as for example between the transmitter 3 and antenna 4. A predetermined portion of the energy at this point may be applied to a mixer 16 where it is mixed with sine wave energy of frequency $f_0$ derived from a local oscillator 17. A selected frequency component, say $f_0+f_2$, of the resultant frequency modulated wave of center frequency $f_0 \pm f_2$ produced in mixer 16, is fed to a frequency divider 18, which is preferably a rational frequency divider and divides by a factor $n/m$ to produce a new center frequency $m/n(f_0 \pm f_2)$, where $m \leq n$ and both $m$ and $n$ are integers.

It will be seen that by changing the factor $n/m$ or by changing $f_0$, the center frequency of the negative feedback energy may be likewise changed to obtain the desired center frequency. However, as pointed out hereinbefore the feedback arrangement also provides for controlling or determining the depth of modulation or frequency deviation produced by modulation. It will be seen that the absolute value of the deviation due to modulation is changed by frequency divider 18 (without however changing the depth of modulation). Thus by selecting the factor $n/m$ the absolute frequency deviation due to modulation is determined. It is to be noted that the combination of the local oscillator and mixer do not vary the absolute frequency deviation due to modulation, but due to their variation of the center frequency vary the depth of modulation or modulation factor.

The center frequency of the negative feedback wave is to be determined according to the point at which the negative feedback is to be applied to the input of the receiver. For example, the output of frequency divider 18 may be applied to a point at the very input of the receiver and in this case the center frequency of the energy fed back is preferably also $f_1$, so that no beating frequency is produced as a result of a difference between the center frequency of the incoming wave antenna 1 and the center frequency of the negative feedback wave. A switch 19 is provided so that the negative feedback wave may also be applied to the mixer 7 in place of the local oscillator 8, an additional switch 20 being provided for cutting out the local oscillator; or the feedback may be applied directly to the intermediate frequency amplifiers. Where the energy fed back from the frequency divider 18 is applied to the mixer 7 in place of the local oscillator 8 it is clear that the center frequency of this energy should be the same as that of the local oscillator to thereby produce a suitable center frequency at the output of the mixer in the middle of the I. F. band. When the energy fed back from the frequency divider is to be applied to the intermediate frequency amplifiers 9 it is obvious that its center frequency should be the center frequency of the I. F. band.

While for the sake of simplicity a frequency divider alone has been shown, it is apparent to one versed in the art that combinations of frequency dividers and frequency multipliers may be used in place of frequency divider 18 to obtain the desired division. Suitable frequency multipliers for ultra-high frequency use are known in the art and no reference thereto is required. A suitable frequency divider for ultra-high frequency may be of the type illustrated in U. S. Patent No. 2,159,596 granted May 23, 1939 to R. L. Miller for "Frequency Conversion Circuits." Of course the amplifier in said arrangement is to be an ultra-high frequency amplifier and the other components should likewise be suitable for ultra-high frequency use, preferably having distributed instead of lumped constants.

It is necessary that the phase of the energy fed back be proper and if this is not an inherent function of the system itself a suitable phase control device may be inserted in the system such as for example after the frequency divider to control the phase of the energy fed back.

It is apparent that if the negative feedback wave would appear at the input of the discriminator with a frequency deviation equal to that of the incoming signal it would completely cancel the incoming signal. This of course is undesirable and it is apparent that the frequency deviation of the energy fed back as it appears at the input of the discriminator should be some fraction of the frequency deviation of the input signal, the larger the frequency deviation the more negative feedback, and the greater attenuation of the input signal. As has been pointed out before this frequency deviation is controlled by the values of the integers $n$ and $m$ of the frequency divider.

Numerous details have been omitted from the systems shown such as drop channelling and the insertion of new channels, coupling arrangements, etc. Since these are all well known in the art and are not necessary for the understanding of the present invention their inclusion is not required.

While we have described above the principles of our invention in connection with the specific apparatus, it is to be clearly understood that this description is made only by way of example and not as a limitation to the scope of our invention. The circuit elements would also be selected for U. H. F. use, in general being of the distributed constant as opposed to lumped constant elements.

What is claimed is:

1. A translator for a frequency modulated wave comprising a first channel having means for receiving input frequency modulated wave energy and effecting demodulation thereof into amplitude modulated energy and means for frequency modulating a new wave in accordance with said amplitude modulated energy, and a second channel having means for negatively feeding back, to the input of said first channel, frequency modulated energy of said new wave, said feedback means including means for converting the center frequency of the negative feedback energy and a frequency divider for varying the frequency deviation of said feedback energy.

2. A translator according to claim 1 wherein said converting means comprises a mixer and an oscillator of frequency $f_0$, and wherein said means for varying the frequency deviation comprises a frequency divider dividing by a factor $n/m$ to combinedly produce a wave $m/n$ $(f_0 \pm f_2)$ where $f_2$ is the center frequency of said new wave, and $m/n$ are integers, $m$ being equal to or less than $n$.

3. A translator for translating frequency modulated waves of a given center frequency into frequency modulated waves of another center frequency, and means for feeding back energy of said frequency modulated wave of said other frequency to the input of said translator comprising means for changing the center frequency of the energy fed back, and means for varying in said energy the frequency deviation due to modulation.

4. A translator according to claim 3 wherein said means for changing the center frequency includes a mixer and a source of oscillations.

5. A translator according to claim 3 wherein said means for varying the frequency deviation comprises a frequency divider.

6. A repeater for repeating frequency modulated waves and means for feeding back energy of the frequency modulated waves from an output point of said repeater to an input point of said repeater, said feedback means including means for varying in said feedback energy the frequency modulation deviation.

ROBERT S. BAILEY.
MARTIN SILVER.

REFERENCES CITED

The following references are of record in the file of this patent:

UNITED STATES PATENTS

| Number | Name | Date |
|---|---|---|
| 2,148,532 | Chaffee | Feb. 28, 1939 |
| 2,322,588 | Peterson | June 22, 1943 |
| 2,407,212 | Tunick | Sept. 3, 1946 |
| 2,477,570 | Berg | Aug. 2, 1949 |
| 2,500,090 | Aman | Mar. 7, 1950 |